(12) United States Patent
Toyoda

(10) Patent No.: US 8,872,945 B2
(45) Date of Patent: Oct. 28, 2014

(54) ZOOM LENS AND IMAGE PICKUP UNIT

(71) Applicant: Sony Corporation, Tokyo (JP)

(72) Inventor: Koji Toyoda, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 13/904,614

(22) Filed: May 29, 2013

(65) Prior Publication Data

US 2013/0321689 A1    Dec. 5, 2013

(30) Foreign Application Priority Data

Jun. 5, 2012  (JP) ................. 2012-127982

(51) Int. Cl.
| | |
|---|---|
| *H04N 5/262* | (2006.01) |
| *H04N 5/225* | (2006.01) |
| *G02B 9/60* | (2006.01) |
| *G02B 13/02* | (2006.01) |
| *G02B 27/64* | (2006.01) |
| *G02B 13/00* | (2006.01) |
| *G02B 15/173* | (2006.01) |

(52) U.S. Cl.
CPC ............ *G02B 13/009* (2013.01); *G02B 27/646* (2013.01); *G02B 15/173* (2013.01)
USPC ...... 348/240.99; 348/335; 348/360; 359/746; 359/763

(58) Field of Classification Search
CPC ............ H04N 5/23296; H04N 5/2254; H04N 5/23212; H04N 5/2628; G02B 27/646; G02B 13/009; G02B 15/173; G02B 13/02; G02B 9/60; G02B 15/16
See application file for complete search history.

(56) References Cited

U.S. PATENT DOCUMENTS

| | | | | |
|---|---|---|---|---|
| 5,548,445 | A * | 8/1996 | Yahagi ..................... | 359/677 |
| 6,999,240 | B2 | 2/2006 | Yamada et al. | |
| 7,830,613 | B2 * | 11/2010 | Ichikawa .................. | 359/687 |
| 8,212,913 | B2 * | 7/2012 | Yoshitsugu et al. ...... | 348/335 |
| 2003/0117717 | A1 * | 6/2003 | Ohtake et al. ............ | 359/683 |
| 2004/0021791 | A1 * | 2/2004 | Nishina .................... | 348/335 |

FOREIGN PATENT DOCUMENTS

| | | |
|---|---|---|
| JP | 2003-228001 A | 8/2003 |
| JP | 2003-241098 A | 8/2003 |
| JP | 2006-023593 A | 1/2006 |

* cited by examiner

*Primary Examiner* — Luong T Nguyen
(74) *Attorney, Agent, or Firm* — Lerner, David, Littenberg, Krumholz & Mentlik, LLP

(57) ABSTRACT

A zoom lens includes: a first lens group having a positive refracting power; a second lens group having a negative refracting power; a third lens group having a positive refracting power; a fourth lens group having a positive refracting power; and a fifth lens group having a positive refracting power and configured of sub lens groups. The first, the second, the third, the fourth, and the fifth lens groups are arranged in this order from an object plane. The third lens group serves as a first compensation lens group, and one or more of the plurality of sub lens groups serves as a second compensation lens group. Each of the first compensation lens group and the second compensation lens group independently shifts in a direction perpendicular to a light axis to allow an image formed on an image plane to be shifted in the direction perpendicular to the light axis.

6 Claims, 5 Drawing Sheets

ZOOM LENS AND IMAGE PICKUP UNIT

CROSS-REFERENCE TO RELATED APPLICATION

The present application claims priority from Japanese Patent Application No. JP 2012-127982 filed in the Japanese Patent Office on Jun. 5, 2012, the entire content of which is incorporated herein by reference.

BACKGROUND

The present disclosure relates to a zoom lens suitable for a small digital video camera or a digital still camera which may have a zoom factor of, for example, about 10 to 15 magnifications, and to an image pickup unit using such a zoom lens. In particular, the disclosure relates to a zoom lens having an optical image-blur compensation function and an image pickup unit using the zoom lens.

Recently, small-size image pickup units such as digital video camera and a digital camera have been widely used as a home unit. Such small-size image pickup units are typically demanded to be reduced in size in great consideration of portability, be improved in image quality, and be increased in magnification. Photographing lenses to be mounted in such image pickup units, particularly a zoom lens, are therefore also demanded to be reduced in size through a reduction in overall length and depth, and be improved in lens performance. Furthermore, the zoom lens is recently greatly demanded to have in particular an optical image-blur compensation function. Consequently, a difficulty level of design to satisfy such demands, such as small size, high image quality, high magnification, and the optical image-blur compensation function, is now extremely high. Under such circumstances, for example, Japanese Unexamined Patent Application Publication Nos. 2003-228001, 2006-23593, and 2003-241098 (JP-A-2003-228001, JP-A-2006-23593, and J-PA-2003-241098) each disclose a zoom lens having five or more lens groups, in which an optical image-blur compensation technique is introduced.

The zoom lens described in JP-A-2003-228001 is configured of, in order from an object plane, a first lens group having a positive refracting power, a second lens group having a negative refracting power, a third lens group having a positive refracting power, a fourth lens group having a negative refracting power, and a fifth lens group having a positive refracting power. In this zoom lens, the third lens group includes a lens having a positive refracting power and a lens having a negative refracting power, and is configured to be movable in a direction perpendicular to a light axis in order to compensate a variation in an image due to shake of hands. A zoom lens for a video camera, which has optical image-blur compensation capability, is achieved through such a configuration.

The zoom lens described in JP-A-2006-23593 is configured of, in order from an object plane, a first lens group having a positive refracting power, a second lens group having a negative refracting power, a third lens group having a positive refracting power, a fourth lens group having a positive refracting power, and a fifth lens group having a positive refracting power. In this zoom lens, the fifth lens group is configured of a positive sub-group having a positive refracting power and a negative sub-group having a negative refracting power, and the positive sub-group is shifted in a direction substantially perpendicular to a light axis direction to shift an image. A zoom lens, which has optical image-blur compensation capability, for use in a video camera, etc., is achieved through such a configuration.

The zoom lens described in JP-A-2003-241098 includes a varying-power optical system having a vibration-proof function, in which lens groups other than a first lens group nearest to an object are provided as vibration-proof lens groups. In the zoom lens, the vibration-proof lens group includes, in order from an object plane, a front section, a middle section, and a rear section, and the front section and the rear section are moved in a direction substantially perpendicular to a light axis to compensate blur of an image.

SUMMARY

The zoom lens described in each of JP-A-2003-228001, JP-A-2006-23593, and JP-A-2003-241098 is designed such that an excellent image and excellent optical performance are achieved by moving all or part of one lens group in order to compensate blur of an image mainly caused by shake of hands particularly in telephoto photographing.

Recently, however, size of an image-blur compensation mechanism significantly increases, which is nonnegligible in light of a reduction in size of an overall lens barrel including mechanical parts. For example, the zoom lens described in JP-A-2003-228001 is configured such that the third lens group is movable in a direction perpendicular to a light axis in order to compensate a variation in image due to shake of hands. In the third lens group, however, a beam typically tends to be widely spread compared with beams in other lens groups (other than the first lens group), and therefore effective diameter on a lens surface extremely increases in light of performing image-blur compensation, resulting in an increase in unit size. Furthermore, the third lens group is located at substantially the center of the total zoom lens system, and is configured to have high refracting power. If, therefore, the third lens group moves in a direction perpendicular to a light axis, a beam position greatly varies in each of other lens groups. This results in an increase in effective diameter on a surface of each of lenses configuring other lens groups, leading to an increase in overall unit size.

Moreover, the zoom lens described in each of JP-A-2003-228001, JP-A-2006-23593, and JP-A-2003-241098 provides a small image-blur compensation effect, and results in conspicuous degradation in image quality due to shake of hands particularly in telephoto photographing. For example, in the zoom lens according to JP-A-2006-23593, the fifth lens group is configured of the positive sub-group and the negative sub-group, and the positive sub-group is shifted in a direction substantially perpendicular to a light axis direction to achieve an image-blur compensation effect. A shift level of the lens group to be shifted, however, inevitably increases to achieve a large image-blur compensation effect. This results in a significant increase in variation in aberration and a reduction in quantity of light in the periphery of a screen, leading to significant degradation of image quality. Furthermore, size of an image-blur compensation mechanism also significantly increases, resulting in an increase in overall unit size. In the zoom lens described in JP-A-2003-241098, one lens group is divided into three lens sections of the front section, the middle section, and the rear section, and the front and rear lens sections are moved for vibration proof, resulting in an image-blur compensation function. Unfortunately, movement of the vibration-proof lens section becomes larger when enhancing the image-blur compensation function particularly in telephoto photographing, which extremely adversely affects image quality. Furthermore, since a plurality of lens sections are moved within one lens group, mechanisms that drive the lens sections are necessary to be disposed in a small region without interference, leading to a complicated and large unit, and an increase in cost.

As described above, in the zoom lens described in each of JP-A-2003-228001, JP-A-2006-23593, and JP-A-2003-241098, it is difficult to achieve size reduction in achieving sufficiently-effective image-blur compensation effect together with high magnification and high image quality.

It is desirable to provide a zoom lens capable of achieving a sufficient image-blur compensation effect together with small size, high magnification, and high image quality, and an image pickup unit including the zoom lens.

A zoom lens according to an embodiment of the disclosure includes: a first lens group having a positive refracting power; a second lens group having a negative refracting power; a third lens group having a positive refracting power; a fourth lens group having a positive refracting power; and a fifth lens group having a positive refracting power, and being configured of a plurality of sub lens groups. The first lens group, the second lens group, the third lens group, the fourth lens group, and the fifth lens group are arranged in this order from an object plane. The third lens group serves as a first compensation lens group, and one or more of the plurality of sub lens groups serves as a second compensation lens group, and each of the first compensation lens group and the second compensation lens group is configured to independently shift in a direction perpendicular to a light axis to allow an image formed on an image plane to be shifted in the direction perpendicular to the light axis.

An image pickup unit according to an embodiment of the disclosure is provided with a zoom lens and an image pickup unit that outputs an image pickup signal corresponding to an optical image formed by the zoom lens. The zoom lens includes: a first lens group having a positive refracting power; a second lens group having a negative refracting power; a third lens group having a positive refracting power; a fourth lens group having a positive refracting power; and a fifth lens group having a positive refracting power, and being configured of a plurality of sub lens groups. The first lens group, the second lens group, the third lens group, the fourth lens group, and the fifth lens group are arranged in this order from an object plane. The third lens group serves as a first compensation lens group, and one or more of the plurality of sub lens groups serves as a second compensation lens group, and each of the first compensation lens group and the second compensation lens group is configured to independently shift in a direction perpendicular to a light axis to allow an image formed on an image plane to be shifted in the direction perpendicular to the light axis.

In the zoom lens and the image pickup unit according to the above-described embodiments of the disclosure, the zoom lens as a whole has a five-group-zoom configuration in which each of the lens groups is optimally configured, and each of the two compensation lens groups is configured to independently shift in the direction perpendicular to the light axis.

According to the zoom lens and the image pickup unit of the above-described embodiments of the disclosure, the zoom lens as a whole has the five-group-zoom configuration, and the two compensation lens groups that are configured to independently shift in the direction perpendicular to the light axis are appropriately provided, while each of the lens groups is optimally configured. Hence, it possible to achieve a sufficient image-blur compensation effect together with small size, high magnification, and high image quality.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Hereinafter, some embodiments of the disclosure will be described in detail with reference to the accompanying drawings. It is to be noted that description is made in the following order.

Figure 1:
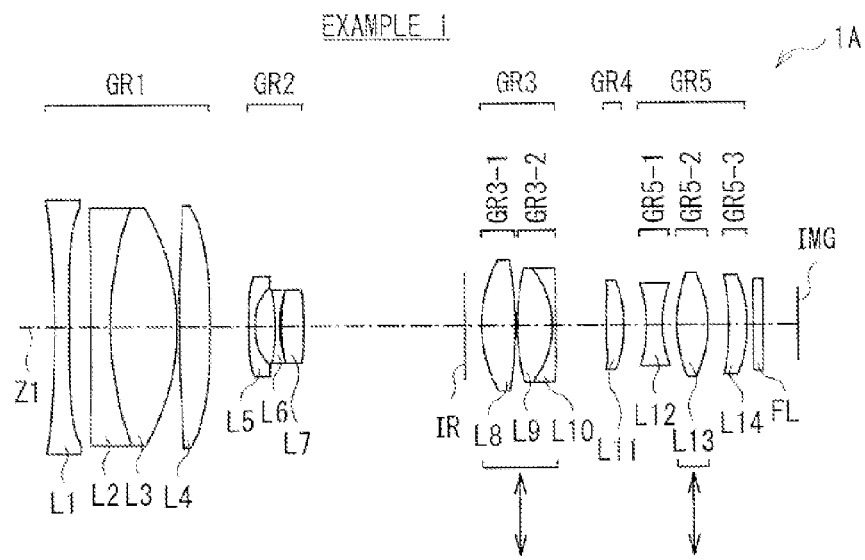
FIG. 1 is a lens section view corresponding to numerical example 1, illustrating a first exemplary configuration of a zoom lens according to an embodiment of the disclosure.
Figure 5:
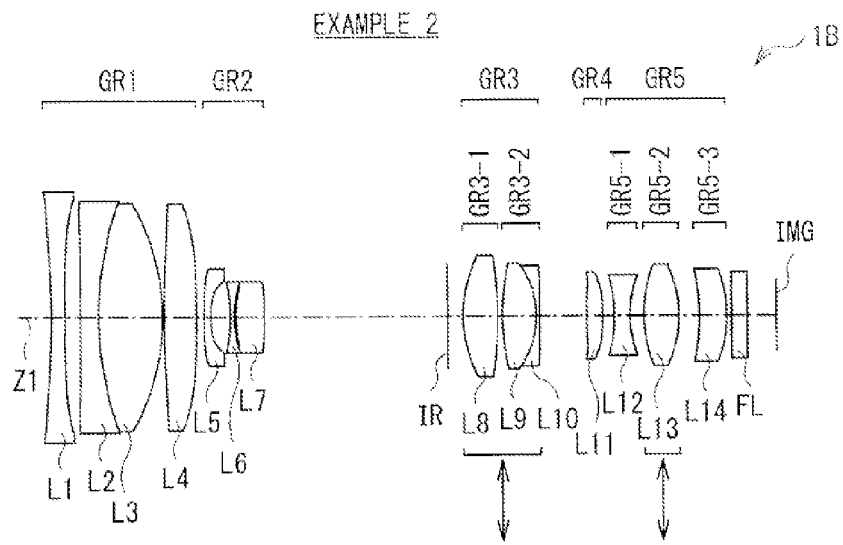
FIG. 5 is a lens section view corresponding to numerical example 2, illustrating a second exemplary configuration of the zoom lens.

1. Basic configuration of lenses
2. Functions and effects
3. Application example to image pickup unit
4. Numerical examples of lenses
5. Other embodiments 1. Basic Configuration of Lenses FIG. 1 illustrates a first exemplary configuration of a zoom lens according to an embodiment of the disclosure. The first exemplary configuration corresponds to a lens configuration of numerical example 1 described later. FIG. 5 illustrates a second exemplary configuration. The second exemplary configuration corresponds to a lens configuration of numerical example 2 described later. In FIGS. 1 and 5, a sign IMG represents an image plane, and a sign Z1 represents a light axis.

A zoom lens according to the present embodiment is configured of substantially five lens groups arranged in order from an object plane along the light axis Z1, i.e., a first lens group GR1 having a positive refracting power, a second lens group GR2 having a negative refracting power, a third lens group GR3 having a positive refracting power, a fourth lens group GR4 having a positive refracting power, and a fifth lens group GR5 having a positive refracting power.

An optical filter FL may be disposed between the fifth lens group GR5 and the image plane IMG. An aperture stop IR may be provided between the second lens group GR2 and the third lens group GR3.

Preferably, each of the first lens group GR1, the second lens group GR2, the third lens group GR3, the fourth lens group GR4, and the fifth lens group GR5 may have one or more surfaces configured of an aspheric surface.

In the zoom lens 1A according to the first exemplary configuration of FIG. 1, the first lens group GR1 and the third lens group GR3 are fixed without traveling in a light axis direction in an operation of varying power. The second lens group GR2 travels in the light axis direction in the operation of varying power, and the fourth lens group GR4 travels in the light axis direction for compensation of a focal position shift associated with the operation of varying power and for focusing.

In the zoom lens 1B according to the second exemplary configuration of FIG. 5, each of the first lens group GR1, the second lens group GR2, and the third lens group GR3 travels in the light axis direction in an operation of varying power. The fourth lens group GR4 travels in the light axis direction for compensation of a focal position shift associated with the operation of varying power and for focusing.

The third lens group GR3 is configured of two groups of a lens group GR3-1 having a positive refracting power and a lens group GR3-2 having a negative refracting power. The lens group GR3-2 is configured of a lens having a positive refracting power and a lens having a negative refracting power, the lenses being cemented to each other. The third lens group GR3 as a whole is configured, as a first compensation lens group, to shift in a direction substantially perpendicular to the light axis Z1. The third lens group GR3 is shifted, as the first compensation lens group, in the direction substantially perpendicular to the light axis Z1, making it possible to shift an image formed on the image plane IMG in the direction substantially perpendicular to the light axis Z1 as well. As a result, blur of an image due to shake of hands, etc., is compensated by shifting the third lens group GR3 in the direction substantially perpendicular to the light axis.

The fifth lens group GR5 is configured of a plurality of sub lens groups. Specifically, the fifth lens group GR5 is configured of three sub lens groups, i.e., a first sub lens group GR5-1, a second sub lens group GR5-2, and a third sub lens group GR5-3 in order from an object plane. The first sub lens group GR5-1 has a negative refracting power, and is a fixed group having a normally-fixed position. The second sub lens group GR5-2 has a positive refracting power, and is a movable group that is configured to shift, as a second compensation lens group, in the direction substantially perpendicular to the light axis Z1. The third sub lens group GR5-3 has a positive refracting power, and is a fixed group having a normally-fixed position. The sub lens group GR5-2 as the movable group in the fifth lens group GR5 is shifted, as the second compensation lens group, in the direction substantially perpendicular to the light axis Z1, making it possible to shift an image formed on the image plane in the direction substantially perpendicular to the light axis as well. As a result, blur of an image due to shake of hands, etc., is compensated by shifting the sub lens group GR5-2 as the movable group in the fifth lens group GR5 in the direction substantially perpendicular to the light axis.

In addition, preferably, the zoom lens according to the present embodiment may satisfy conditional expressions described later.

2. Functions and Effects

Functions and effects of the zoom lens according to the present embodiment are now described. In particular, the functions and effects related to image-blur compensation are described.

In the zoom lens according to the present embodiment, each of the first compensation lens group (third lens group GR3) and the second compensation lens group (the sub lens group GR5-2 in the fifth lens group GR5) is configured to independently shift in the direction perpendicular to the light axis Z1 to allow an image formed on an image plane to be shifted in the direction perpendicular to the light axis Z1. The two compensation lens groups are independently shifted in the direction substantially perpendicular to the light axis Z1, thereby appropriate compensation amount is allowed to be set according to zoom positions, making it possible to shift an image formed on an image plane in the direction substantially perpendicular to the light axis Z1. Consequently, an excellent image-blur compensation effect is achieved.

Moreover, each of the first compensation lens group and the second compensation lens group may be configured to have one or more aspheric surfaces, making it possible to suppress a variation in aberration upon shifting of each of the two compensation lens groups in the direction substantially perpendicular to the light axis. Specifically, the third lens group GR3 may be set to have one or more aspheric surfaces, which particularly contributes to suppress a variation in coma aberration and astigmatism. The second sub lens group GR5-2 in the fifth lens group GR5 may be set to have one or more aspheric surfaces, which particularly contributes to suppress a variation in distortion. Consequently, an extremely large image-blur compensation effect is achieved while suppressing influence on image quality.

As described below, conditional expression (1) may be satisfied so that a relative relationship between the image-blur compensation effect of the first compensation lens group and the image-blur compensation effect of the second compensation lens group at a wide-angle end is appropriately set, which makes it possible to achieve an extremely large image-blur compensation effect at the wide-angle end together with a reduction in size of a lens barrel.

As described below, conditional expression (2) may be satisfied so that a relative relationship between the image-blur compensation effect of the first compensation lens group and the image-blur compensation effect of the second compensation lens group at a telephoto end is appropriately set, which makes it possible to achieve an extremely large image-blur compensation effect at the telephoto end together with a reduction in size of a lens barrel.

(Description of Conditional Expressions)

Preferably, in the zoom lens according to the present embodiment, the two compensation lens groups may so shift as to satisfy the following conditional expressions (1) and (2).

Preferably, each of the first compensation lens group and the second compensation lens group may so independently shift in the direction perpendicular to the light axis Z1 at a wide-angle end as to satisfy the following conditional expression (1):

$$0 < \{(1-\beta 3w)\beta 3wr \times D3w\}/\{(1-\beta 5w)\beta 5wr \times D5w\} < 1 \qquad (1)$$

where, at the wide-angle end, $\beta 3w$ is a lateral magnification of the first compensation lens group, $\beta 3wr$ is a lateral magnification, as a whole (a total lateral magnification), of the lens groups located between the first compensation lens group and the image plane (located nearer to the image plane than the first compensation lens group), $D3w$ is a shift distance of the first compensation lens group in the direction perpendicular to the light axis, $\beta 5w$ is a lateral magnification of the second compensation lens group, $\beta 5wr$ is a lateral magnification, as a whole (a total lateral magnification), of a lens group (one or more of the sub lens groups) located between the second compensation lens group and the image plane (located nearer to the image plane than the second compensation lens group), and $D5w$ is a shift distance of the second compensation lens group in the direction perpendicular to the light axis.

The conditional expression (1) is to appropriately set the relative relationship between the image-blur compensation effect of the first compensation lens group (the third lens group GR3) and the image-blur compensation effect of the second compensation lens group (the second sub lens group GR5-2 in the fifth lens group GR5) at a wide-angle end. The blanket $\{(1-\beta 3w)\beta 3wr \times D3w\}$ corresponds to the image-blur compensation effect of the first compensation lens group at the wide-angle end, and the blanket $\{(1-\beta 5w)\beta 5wr \times D5w\}$ corresponds to the image-blur compensation effect of the second compensation lens group at the wide-angle end. The formula $(1-\beta 3w)\beta 3wr$, which represents the decentering sensitivity of the third lens group GR3 at the wide-angle end, is multiplied by the shift distance $D3w$ of the third lens group GR3 at the wide-angle end to define displacement of an imaging point by the third lens group GR3, i.e., the image-blur compensation amount at the wide-angle end by the third lens group GR3. The formula $(1-\beta 5w)\beta 5wr$, which represents the decentering sensitivity of the second sub lens group GR5-2 at the wide-angle end, is multiplied by the shift distance $D5w$ of the second sub lens group GR5-2 at the wide-angle end to define displacement of an imaging point by the second sub lens group GR5-2, i.e., the image-blur compensation amount at the wide-angle end by the second sub lens group GR5-2.

The value of the compensation effect is defined to satisfy the condition expressed by the conditional expression (1) at the wide-angle end so that an extremely large image-blur compensation effect is achieved together with a reduction in size of a lens barrel. The condition is in particular a condition to reduce the lens aperture of the first lens group GR1 disposed nearer to a subject than any other lens group. If the image-blur compensation effect at the wide-angle end is made dependent on the third lens group GR3, a variation in beam position increases particularly in the first lens group GR1, which leads to an increase in overall unit size. In contrast, when the image-blur compensation effect at the wide-angle end is made dependent on the second sub lens group GR5-2, a variation in beam position is reduced particularly in the first lens group GR1, thereby making it possible to achieve a large image-blur compensation effect and a reduction in overall unit size. At the wide-angle end, the image-blur compensation by the third lens group GR3 greatly affects a variation in aberration and/or a variation in the quantity of ambient light relatively compared with the image-blur compensation by the second sub lens group GR5-2, leading to degradation in image quality. In particular, this may cause aberration such as coma aberration and/or asymmetric quantity of ambient light, which significantly degrades image quality. The action of the second sub lens group GR5-2, however, may be insufficient by itself to achieve a larger image-blur compensation effect. Thus, the third lens group GR3 and the second sub lens group GR5-2 are driven to concurrently work, thereby making it possible to meet desired objectives. Hence, a ratio of the image-blur compensation effect of the third lens group GR3 to the image-blur compensation effect of the second sub lens group GR5-2 is appropriately defined, thereby achieving an extremely large image-blur compensation effect together with a reduction in size of a lens barrel while suppressing influence on image quality.

More preferably, the numerical range of the conditional expression (1) may be set as defined in conditional expression (1a). This makes it possible to achieve an extremely large image-blur compensation effect while suppressing influence on image quality.

$$0.5 < \{(1-\beta 3w)\beta 3wr \times D3w\}/\{(1-\beta 5w)\beta 5wr \times D5w\} < 1 \qquad (1a)$$

Preferably, each of the first compensation lens group and the second compensation lens group may so independently shift in the direction perpendicular to the light axis Z1 at a telephoto end as to satisfy the following conditional expression (2):

$$1 < \{(1-\beta 3t)\beta 3tr \times D3t\}/\{(1-\beta 5t)\beta 5tr \times D5t\} < 2 \qquad (2)$$

where, at the telephoto end, $\beta 3t$ is a lateral magnification of the first compensation lens group, $\beta 3tr$ is a lateral magnification, as a whole (a total lateral magnification), of the lens groups located between the first compensation lens group and the image plane (located nearer to the image plane than the first compensation lens group), $D3t$ is a shift distance of the first compensation lens group in the direction perpendicular to the light axis, $\beta 5t$ is a lateral magnification of the second compensation lens group, $\beta 5tr$ is a lateral magnification, as a whole (a total lateral magnification), of a lens group (one or more of the sub lens groups) located between the second compensation lens group and the image plane (located nearer to the image plane than the second compensation lens group), and $D5t$ is a shift distance of the second compensation lens group in the direction perpendicular to the light axis.

The conditional expression (2) is to appropriately set the relative relationship between the image-blur compensation effect of the first compensation lens group (the third lens group GR3) and the image-blur compensation effect of the second compensation lens group (the second sub lens group GR5-2 in the fifth lens group GR5) at a telephoto end. The blanket $\{(1-\beta 3t)\beta 3tr \times D3t\}$ corresponds to the image-blur compensation effect of the first compensation lens group at the telephoto end, and the blanket $\{(1-\beta 5t)\beta 5tr \times D5t\}$ corresponds to the image-blur compensation effect of the second compensation lens group at the telephoto end. The formula $(1-\beta 3t)\beta 3tr$, which represents the decentering sensitivity of the third lens group GR3 at the telephoto end, is multiplied by the shift distance $D3t$ of the third lens group GR3 at the telephoto end to define displacement of an imaging point by the third lens group GR3, i.e., the image-blur compensation amount at the telephoto end by the third lens group GR3. The formula $(1-\beta 5t)\beta 5tr$, which represents the decentering sensitivity of the second sub lens group GR5-2 at the telephoto end, is multiplied by the shift distance $D5t$ of the second sub lens group GR5-2 at the telephoto end to define displacement of an imaging point by the second sub lens group GR5-2, i.e., the image-blur compensation amount at the telephoto end by the second sub lens group GR5-2.

The value of the compensation effect is defined to satisfy the condition expressed by the conditional expression (2) at the telephoto end so that an extremely large image-blur compensation effect is achieved together with excellent image quality. If the image-blur compensation effect at the telephoto end is made dependent on the second sub lens group GR5-2, the shift distance of the second sub lens group GR5-2 relatively increases, which increases influence on a variation in aberration, leading to degradation in image quality. In particular, this may cause aberration such as coma aberration, which significantly degrades image quality. Furthermore, the increased shift distance leads to an increase in overall unit size. In contrast, when the image-blur compensation effect at the telephoto end is made dependent on the third lens group GR3, the shift distance is relatively reduced, and thus influence on the variation in aberration is allowed to be reduced, making it possible to achieve a large image-blur compensation effect and excellent image quality. The action of the third lens group GR3, however, may be insufficient by itself to achieve a larger image-blur compensation effect. Thus, the lens group GR3 and the second sub lens group GR5-2 are driven to concurrently work, thereby making it possible to meet desired objectives. Hence, a ratio of the image-blur compensation effect of the third lens group GR3 to the image-blur compensation effect of the second sub lens group GR5-2 is appropriately defined, thereby achieving an extremely large image-blur compensation effect together with a reduction in size of a lens barrel while suppressing influence on image quality.

More preferably, the numerical range of the conditional expression (2) may be set as defined in conditional expression (2a). This makes it possible to achieve an extremely large image-blur compensation effect while suppressing influence on image quality.

$$1 < \{(1-\beta 3t)\beta 3tr \times D3t\}/\{(1-\beta 5t)\beta 5tr \times D5t\} < 1.6 \quad (2a)$$

As described above, according to the present embodiment, the zoom lens as a whole has the five-group-zoom configuration, and the two compensation lens groups that are configured to independently shift in the direction perpendicular to the light axis are appropriately provided, while each of the lens groups is optimally configured. Hence, it possible to achieve a sufficient image-blur compensation effect together with small size, high magnification, and high image quality.

In particular, the conditional expressions may be appropriately set as described above to perform optimum compensation control at each of the wide-angle end and the telephoto end, thereby making it possible to achieve a sufficient image-blur compensation effect, excellent image quality, and a reduction in overall unit size together. Furthermore, in an intermediate region between the wide-angle end and the telephoto end, the third lens group GR3 and the second sub lens group GR5-2 may be independently driven to optimally work based on the comprehensive consideration of the image-blur compensation effect, image quality, and a reduction in unit size.

3. Application Example to Image Pickup Unit

Figure 9:
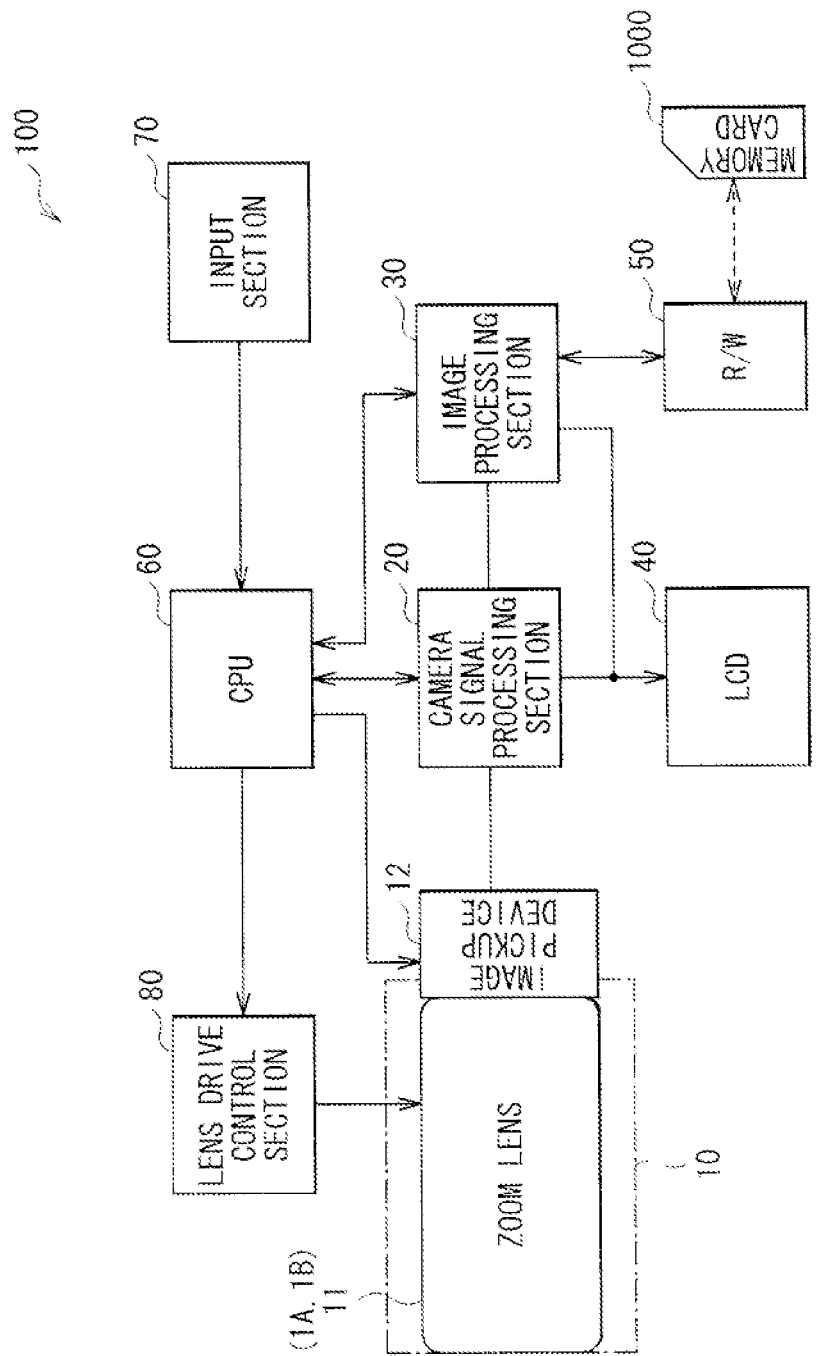
FIG. 9 is a block diagram illustrating an exemplary configuration of an image pickup unit.

FIG. 9 illustrates an exemplary configuration of an image pickup unit 100 to which the zoom lens according to the present embodiment is applied. The image pickup unit 100 may be, for example, a digital still camera, and includes a camera block 10, a camera signal processing section 20, an image processing section 30, a liquid crystal display (LCD) 40, a reader/writer (R/W) 50, a central processing unit (CPU) 60, and an input section 70.

The camera block 10 is responsible for an image pickup function, and includes an optical system including a zoom lens 11 (the zoom lens 1A illustrated in FIG. 1 or the zoom lens 1B illustrated in FIG. 5) as an image pickup lens, and an image pickup device 12 such as a charge coupled device (CCD) or a complementary metal oxide semiconductor (CMOS). The image pickup device 12 converts an optical image formed by the zoom lens 11 to electric signals, and thus outputs an image pickup signal (image signal) corresponding to the optical image.

The camera signal processing section 20 performs various types of signal processing for the image signal output from the image pickup device 12. The signal processing may include analog-to-digital conversion, noise removal, image quality compensation, and conversion to luminance and color difference signals.

The image processing section 30 performs recording/reproduction processing of an image signal, such as compression coding and decompression decoding of image signals based on a predetermined image data format, and conversion of data specification such as resolution.

The LCD 40 has a function of displaying a state of user operation on the input section 70 and various data such as a captured image. The R/W 50 writes image data coded by the image processing section 30 into a memory card 1000, and reads the recorded image data from the memory card 1000. The memory card 1000 may be, for example, a semiconductor memory that is removably provided in a slot connected to the R/W 50.

The CPU 60 serves as a control processing section that controls each of circuit blocks provided in the image pickup unit 100, and controls each circuit block based on an input instruction signal, etc., from the input section 70. The input section 70 includes various switches, etc., for certain user operation, and may be configured of, for example, a shutter release button for shutter operation, a select switch for selection of an operation mode, etc., and outputs an input instruction signal to the CPU 60 corresponding to user operation. A lens drive control section 80, which controls drive of each lens disposed in the camera block 10, controls an undepicted motor, etc., for driving each lens of the zoom lens 11 based on a control signal from the CPU 60.

The image pickup unit 100 includes an undepicted shake detection section that detects shake of the unit associated with shake of hands.

Operation of the image pickup unit 100 is now described. During standby for photographing, an image signal captured by the camera block 10 is output to the LCD 40 via the camera signal processing section 20, and is displayed thereon in a form of a camera-through image, under control by the CPU 60. For example, upon reception of an input instruction signal for zooming or focusing from the input section 70, the CPU 60 outputs a control signal to the lens drive control section 80, and a predetermined lens of the zoom lens 11 moves under the control of the lens drive control section 80.

When an undepicted shutter in the camera block 10 is activated in response to an input instruction signal from the input section 70, a captured image signal is output from the camera signal processing section 20 to the image processing section 30 for compression coding processing, and is converted into digital data of a predetermined data format. The converted data is output to the R/W 50, and is then written into the memory card 1000.

It is to be noted that focusing may be performed, for example, as follows: when the shutter release button of the input section 70 is pressed halfway down, or is pressed all the way down for recording (photographing), etc., the lens drive control section 80 moves a predetermined lens of the zoom lens 11 based on a control signal from the CPU 60.

In the case where image data recorded in the memory card 1000 is reproduced, the R/W 50 reads out predetermined image data from the memory card 1000 according to operation on the input section 70, the image processing section 30 then performs decompression decoding processing to the image data, and the reproduced image signal is then output to the LCD 40 on which the reproduced image is then displayed.

Moreover, the CPU 60 activates the lens drive control section 80 based on a signal output from the undepicted shake detection section to shift the vibration-proof compensation lens groups in a direction substantially perpendicular to the light axis Z1 according to a shake level.

It is to be noted that although the above-described embodiment provides an application example of the image pickup unit to a digital still camera, the applicability of the image pickup unit is not limited to the digital still camera, and other various electronic apparatuses may each be a specific application object of the image pickup unit 100. For example, other various electronic apparatuses such as a camera with interchangeable lenses, a digital video camera, a mobile phone incorporating therein a digital video camera, etc., and a personal digital assistant (PDA) may each be a specific application object of the image pickup unit 100.

EXAMPLES

4. Numerical Examples of Lenses

Specific numerical examples of the zoom lens according to the present embodiment are now described. It is to be noted that the meaning of each sign in Tables and description is as follows. A sign "Ri" represents the paraxial curvature radius (mm) of an i-th surface marked incrementally toward an image assuming that the surface of a component nearest to an object is a first surface. A sign "Di" represents an interval (mm) on a light axis between an i-th surface and an (i+1)th surface. A sign "Ni" represents a value of a refractive index at d-line 587.6 nm in wavelength of a material (medium) configuring an i-th lens. A sign "vi" represents a value of an Abbe number at the d-line of the material configuring the i-th lens. It is to be noted that "DFL" represents spacing of a filter FL, "NFL" represents a refractive index of the filter FL, and "vFL" represents Abbe number of the filter FL. A surface having a curvature radius of "∞" represents a plane or an aperture surface.

In each Example, a shape of an aspheric surface is given by an aspheric formula shown below. In data of aspheric coefficients, a sign "E" represents that a following numeric is a "power index" in base 10, and a numeric before "E" is multiplied by the numeric expressed by the exponential function in base 10.

For example, "1.0E-05" represents "$1.0 \times 10^{-5}$".

$$Xi = (Ci \cdot Y^2)/\{1+(1-Ci^2 \cdot Y^2)^{1/2}\} + A4 \cdot Y^4 + A6 \cdot Y^6 \cdot Y^8 + A10 \cdot Y^{10}$$ (Aspheric Formula)

Where, "Xi" is a coordinate in a light axis direction of an aspheric surface of an i-th surface, "Ci" is a paraxial curvature (the reciprocal of the paraxial curvature radius Ri) of the i-th surface, and "Y" is a distance from a light axis. A4, A6, A8, and A10 are fourth-order, sixth-order, eighth-order, and tenth-order aspherical coefficients, respectively.

Each of zoom lens 1A according to numerical example and zoom lens 1B according to numerical example 2 is configured to satisfy the above-described basic configuration of lenses and desirable conditions.

Numerical Example 1

The zoom lens 1A according to the numerical example 1 is configured of 14 lenses in total as illustrated in FIG. 1. The first lens group GR1 as a whole has a positive refracting power, and is configured of four lenses, i.e., first to fourth lenses L1 to L4. It is to be noted that the second lens L2 and the third lens L3 configure a cemented lens with a cemented surface having a curvature radius R4. Specifically, a concave surface on a side near an image plane of the second lens L2 and a convex surface on a side near an object of the third lens L3 are cemented together with the same curvature radius R4. A surface on a side near the image plane of the first lens L1 and two surfaces of the fourth lens L4 are each configured of an aspherical surface.

The second lens group GR2 as a whole has a negative refracting power, and is configured of three lenses, i.e., fifth to seventh lenses L5 to L7. The second lens group GR2, the position of which is movable in a light axis direction, is provided mainly for varying power. Two surfaces of the fifth lens L5 and two surfaces of the seventh lens L7 are each configured of an aspherical surface.

The third lens group GR3 as a whole has a positive refracting power, and is configured of three lenses, i.e., eighth to tenth lenses L8 to L10. The third lens group GR3, which is movable in a direction substantially perpendicular to the light axis Z1, is shifted in the direction substantially perpendicular to the light axis Z1, making it possible to shift an image formed on the image plane in the direction substantially perpendicular to the light axis Z1 as well. It is to be noted that the ninth lens L9 and the tenth lens L10 configure a cemented lens having a curvature radius R18. Specifically, a convex surface on a side near the image plane of the ninth lens L9 and a concave surface on a side near the object of the tenth lens L10 are cemented together with the same curvature radius R18. Two surfaces of the eighth lens L8 are each configured of an aspherical surface.

The fourth lens group GR4 as a whole has a positive refracting power, and is configured of one lens, i.e., eleventh lens L11. The fourth lens group GR4, the position of which is movable in a light axis direction, is provided for compensation of a variation in image position associated with an operation of varying power and for focusing. It is to be noted that two surfaces of the eleventh lens L11 are each configured of an aspherical surface.

The fifth lens group GR5 as a whole has a positive refracting power, and is configured of three lenses, i.e., twelfth to fourteenth lenses L12 to L14. The twelfth lens L12 has a negative refracting power, and configures the first sub lens group GR5-1 that is a fixed group having a normally-fixed position. The thirteenth lens L13 has a positive refracting power, and configures the second sub lens group GR5-2 being a movable group that is movable in the direction substantially perpendicular to the light axis Z1 as a second compensation lens group. The fourteenth lens L14 has a positive refracting power, and configures the third sub lens group GR5-3 that is a fixed group having a normally-fixed position. The second sub lens group GR5-2 located in the middle is shifted in the direction substantially perpendicular to the light axis Z1, making it possible to shift an image formed on the image plane in the direction substantially perpendicular to the light axis Z1 as well. It is to be noted that two surfaces of the twelfth lens L12, two surfaces of the thirteenth lens L13, and a surface on a side near the image plane of the fourteenth lens L14 are each configured of an aspherical surface.

The optical filter FL is disposed between the fifth lens group GR5 and the image plane IMG. The aperture stop IR is provided between the second lens group GR2 and the third lens group GR3.

Tables 1 to 3 show specific lens data of the zoom lens 1A. In particular, Table 1 shows the basic lens data of the zoom lens 1A, and Table 3 shows data on aspheric surfaces. Table 2 shows other data.

In the zoom lens 1A, each of the second lens group GR2 and the fourth lens group GR4 travels according to an operation of varying power. As a result, spacing before or after each lens group has a variable value. Table 2 shows data of such variable spacing. Specifically, Table 2 shows values of spacing of D7, D13, D19, and D21 at a wide-angle end (f ratio=1.00), an intermediate focal distance (f ratio=3.40), and a telephoto end (f ratio=11.32) with an object at infinite distance.

Each of surfaces having paraxial curvature radii of R2, R6, R7, R8, R9, R12, R13, R15, R16, R20, R21, R22, R23, R24, R25, and R27 is configured of an aspherical surface as described before. Table 3 shows values of the fourth-order, sixth-order, eighth-order, and tenth-order aspherical coefficients A4, A6, A8, and A10, respectively, of such aspheric surfaces.

Table 4 shows values related to the above-described conditional expressions. As can be understood from Table 4, the zoom lens 1A satisfies the values defined by the conditional expressions.

TABLE 1

Example 1

| | Ri | Di | | Ni | | vi |
|---|---|---|---|---|---|---|
| R1 | −20.671 | D1 | 0.341 | N1 | 1.883 v1 | 40.8 |
| R2 | 105.994 | D2 | 0.519 | | | |
| R3 | −156.375 | D3 | 0.462 | N2 | 1.805 v2 | 25.5 |
| R4 | 7.315 | D4 | 1.581 | N3 | 1.593 v3 | 67.0 |
| R5 | −5.014 | D5 | 0.037 | | | |
| R6 | 14.980 | D6 | 0.743 | N4 | 1.851 v4 | 40.1 |
| R7 | −16.126 | D7 | Variable | | | |
| R8 | −7.303 | D8 | 0.158 | N5 | 1.851 v5 | 40.1 |
| R9 | 2.384 | D9 | 0.470 | | | |
| R10 | −3.483 | D10 | 0.097 | N6 | 1.835 v6 | 42.7 |
| R11 | 2.091 | D11 | 0.049 | | | |
| R12 | 2.901 | D12 | 0.536 | N7 | 2.002 v7 | 19.3 |
| R13 | −20.292 | D13 | Variable | | | |
| R14 | ∞ | D14 | 0.384 | | | |
| R15 | 3.474 | D15 | 0.791 | N8 | 1.821 v8 | 42.7 |
| R16 | −6.425 | D16 | 0.053 | | | |
| R17 | 5.119 | D17 | 0.827 | N9 | 1.497 v9 | 81.6 |
| R18 | −1.868 | D18 | 0.097 | N10 | 2.001 v10 | 29.1 |
| R19 | −18.790 | D19 | Variable | | | |
| R20 | 9.258 | D20 | 0.413 | N11 | 1.553 v11 | 71.7 |
| R21 | −3.096 | D21 | Variable | | | |
| R22 | −3.006 | D22 | 0.376 | N12 | 1.881 v12 | 37.3 |
| R23 | 1.864 | D23 | 0.341 | | | |
| R24 | 2.722 | D24 | 0.732 | N13 | 1.697 v13 | 55.4 |
| R25 | −2.270 | D25 | 0.486 | | | |
| R26 | −5.725 | D26 | 0.438 | N14 | 1.689 v14 | 31.2 |
| R27 | −2.265 | D27 | 0.122 | | | |
| R28 | ∞ | DFL | 0.400 | NFL | 1.517 vFL | 64.2 |
| R29 | ∞ | | | | | |

TABLE 2

Example 1

| | Focal ratio | | |
|---|---|---|---|
| | 1 | 3.40 | 11.32 |
| D7 | 0.170 | 2.891 | 4.445 |
| D13 | 4.613 | 1.892 | 0.338 |
| D19 | 1.419 | 0.480 | 1.151 |
| D21 | 0.295 | 1.234 | 0.564 |

TABLE 3

Example 1

| | Aspheric coefficient | | | |
|---|---|---|---|---|
| | A4 | A6 | A8 | A10 |
| R2 | 2.354E−03 | 2.772E−04 | −2.348E−06 | 8.121E−07 |
| R6 | −3.578E−03 | 5.558E−05 | 6.467E−06 | 0.000E+00 |
| R7 | −4.644E−03 | 7.007E−05 | 1.790E−07 | 0.000E+00 |
| R8 | 2.696E−01 | −1.241E−01 | 1.118E−02 | 0.000E+00 |
| R9 | 2.442E−01 | 1.880E−01 | −3.245E−02 | 7.822E−02 |
| R12 | −1.474E−01 | 2.845E−01 | −2.020E−01 | 0.000E+00 |
| R13 | −1.030E−01 | 9.852E−02 | −9.286E−02 | −1.388E−02 |
| R15 | 5.160E+03 | 1.783E−03 | 4.380E−04 | 0.000E+00 |
| R16 | 3.236E−03 | 1.117E−03 | 7.665E−04 | −2.406E−04 |
| R20 | −3.401E−02 | −1.099E−02 | −3.167E−03 | −1.933E−02 |
| R21 | −1.209E−02 | −1.614E−02 | −3.359E−03 | −1.140E−02 |
| R22 | −1.177E−01 | 2.324E−01 | −1.347E−01 | 1.984E−02 |
| R23 | −2.201E−01 | 2.379E−01 | −9.237E−02 | −2.901E−03 |
| R24 | −2.149E−02 | −5.728E−02 | 5.286E−02 | −8.697E−03 |
| R25 | 4.022E−02 | −3.574E−02 | 8.109E−03 | 1.011E−02 |
| R27 | 7.188E−02 | −1.138E−03 | −3.739E−02 | 1.507E−02 |

TABLE 4

Example 1

| | |
|---|---|
| $(1 - \beta 3w)\beta 3wr$ | 1.267 |
| $(1 - \beta 5w)\beta 5wr$ | 0.987 |
| D3w | 0.1 |
| D5w | 0.2 |
| Conditional expression (1) | 0.64 |
| $(1 - \beta 3t)\beta 3tr$ | 1.251 |
| $(1 - \beta 5t)\beta 5tr$ | 0.986 |
| D3t | 0.25 |
| D5t | 0.2 |
| Conditional expression (2) | 1.586 |

Numerical Example 2

The zoom lens 1B according to numerical example 2 is configured of 14 lenses in total as illustrated in FIG. 5, as in the zoom lens 1A according to the numerical example 1. The zoom lens 1B is different from the zoom lens 1A according to the numerical example 1 in moving groups in an operation of varying power. In the zoom lens 1B, each of the first lens group GR1, the second lens group GR2, and the third lens group GR3 travels in the light axis direction in an operation of varying power. The fourth lens group GR4 travels in the light axis direction for compensation of a focal position shift associated with an operation of varying power and for focusing. Other basic configurations are similar to those of the zoom lens 1A according to the numerical example 1.

Tables 5 to 7 show specific lens data of the zoom lens 1B. In particular, Table 5 shows the basic lens data of the zoom lens 1B, and Table 7 shows data on aspheric surfaces. Table 6 shows other data.

In the zoom lens 1B, each of the first to fourth lens groups GR1 to GR4 travels according to an operation of varying power. As a result, spacing before or after each lens group has a variable value. Table 6 shows data of such variable spacing. Specifically, Table 6 shows values of spacing of D7, D13, D19, and D21 at a wide-angle end (f ratio=1.00), an intermediate focal distance (f ratio=4.19), and a telephoto end (f ratio=11.62) with an object at infinite distance.

Each of surfaces having paraxial curvature radii of R2, R6, R7, R8, R9, R12, R13, R15, R16, R20, R21, R22, R23, R24, R25, and R27 is configured of an aspherical surface. Table 7 shows values of the fourth-order, sixth-order, eighth-order, and tenth-order aspherical coefficients A4, A6, A8, and A10, respectively, of such aspheric surfaces.

Table 8 shows values related to the above-described conditional expressions. As can be understood from Table 8, the zoom lens 1B satisfies the values defined by the conditional expressions.

TABLE 5

Example 2

| | Ri | | Di | | Ni | | vi |
|---|---|---|---|---|---|---|---|
| R1 | −20.755 | D1 | 0.340 | N1 | 1.883 | v1 | 40.8 |
| R2 | 122.242 | D2 | 0.348 | | | | |
| R3 | 265.599 | D3 | 0.462 | N2 | 1.805 | v2 | 25.5 |
| R4 | 7.646 | D4 | 1.580 | N3 | 1.593 | v3 | 67.0 |
| R5 | −5.323 | D5 | 0.037 | | | | |
| R6 | 14.025 | D6 | 0.851 | N4 | 1.851 | v4 | 40.1 |
| R7 | −23.544 | D7 | Variable | | | | |
| R8 | −8.707 | D8 | 0.158 | N5 | 1.851 | v5 | 40.1 |
| R9 | 2.157 | D9 | 0.467 | | | | |
| R10 | −3.752 | D10 | 0.097 | N6 | 1.835 | v6 | 42.7 |
| R11 | 1.881 | D11 | 0.049 | | | | |
| R12 | 2.476 | D12 | 0.729 | N7 | 2.002 | v7 | 19.3 |
| R13 | −43.151 | D13 | Variable | | | | |
| R14 | ∞ | D14 | 0.384 | | | | |
| R15 | 3.475 | D15 | 0.851 | N8 | 1.821 | v8 | 42.7 |
| R16 | −8.653 | D16 | 0.152 | | | | |
| R17 | 4.779 | D17 | 0.827 | N9 | 1.497 | v9 | 81.6 |
| R18 | −1.900 | D18 | 0.097 | N10 | 2.001 | v10 | 29.1 |
| R19 | −12.270 | D19 | Variable | | | | |
| R20 | 17.396 | D20 | 0.391 | N11 | 1.553 | v11 | 71.7 |
| R21 | −3.190 | D21 | Variable | | | | |
| R22 | −4.764 | D22 | 0.369 | N12 | 1.881 | v12 | 37.3 |
| R23 | 1.790 | D23 | 0.360 | | | | |
| R24 | 2.819 | D24 | 0.875 | N13 | 1.697 | v13 | 55.4 |
| R25 | −2.155 | D25 | 0.486 | | | | |
| R26 | −4.788 | D26 | 0.669 | N14 | 1.689 | v14 | 31.2 |
| R27 | −2.751 | D27 | 0.122 | | | | |
| R28 | ∞ | DFL | 0.400 | NFL | 1.517 | vFL | 64.2 |
| R29 | ∞ | | | | | | |

TABLE 6

Example 2

| | Focal ratio | | |
|---|---|---|---|
| | 1 | 4.19 | 11.62 |
| D7 | 0.170 | 3.384 | 4.732 |
| D13 | 4.560 | 1.714 | 0.338 |
| D19 | 1.188 | 0.681 | 0.872 |
| D21 | 0.292 | 1.372 | 1.040 |

TABLE 7

Example 2

| | Aspheric coefficient | | | |
|---|---|---|---|---|
| | A4 | A6 | A8 | A10 |
| R2 | 1.671E−03 | 1.911E−04 | 3.538E−06 | −3.294E−08 |
| R6 | −3.864E−03 | 1.599E−05 | 1.523E−05 | 0.000E+00 |
| R7 | −5.086E−03 | 8.325E−05 | 5.644E−06 | 0.000E+00 |
| R8 | 2.318E−01 | −1.398E−01 | 2.606E−02 | 0.000E+00 |
| R9 | 2.126E−01 | 9.160E−02 | −1.807E−02 | −2.900E−02 |
| R12 | −9.945E−02 | 1.835E−01 | −1.103E−01 | 0.000E+00 |
| R13 | −6.597E−02 | 4.646E−02 | −3.367E−02 | −1.233E−02 |
| R15 | 3.966E−03 | 1.597E−03 | 4.754E−04 | 0.000E+00 |
| R16 | 1.654E−03 | 1.116E−03 | 8.966E−04 | −2.165E−04 |
| R20 | −3.909E−03 | −9.304E−03 | 5.843E−03 | −1.111E−02 |
| R21 | −2.020E−02 | −9.286E−03 | 4.358E−03 | −8.059E−03 |
| R22 | −1.443E−01 | 2.192E−01 | −1.349E−01 | 2.947E−02 |
| R23 | −2.169E−01 | 2.097E−01 | −9.801E−02 | 1.054E−02 |
| R24 | −9.653E−04 | −5.750E−02 | 4.872E−02 | −8.570E−03 |
| R25 | 5.458E−02 | −2.545E−02 | 1.528E−03 | 9.813E−03 |
| R27 | 2.665E−02 | 9.847E−03 | −2.844E−02 | 1.040E−02 |

TABLE 8

Example 2

| | |
|---|---|
| $(1 - \beta 3w)\beta 3wr$ | 1.276 |
| $(1 - \beta 5w)\beta 5wr$ | 1.103 |
| D3w | 0.12 |
| D5w | 0.2 |
| Conditional expression (1) | 0.69 |
| $(1 - \beta 3t)\beta 3tr$ | 1.345 |
| $(1 - \beta 5t)\beta 5tr$ | 1.102 |
| D3t | 0.26 |
| D5t | 0.2 |
| Conditional expression (2) | 1.587 |

[Aberration Performance]

Figure 2:
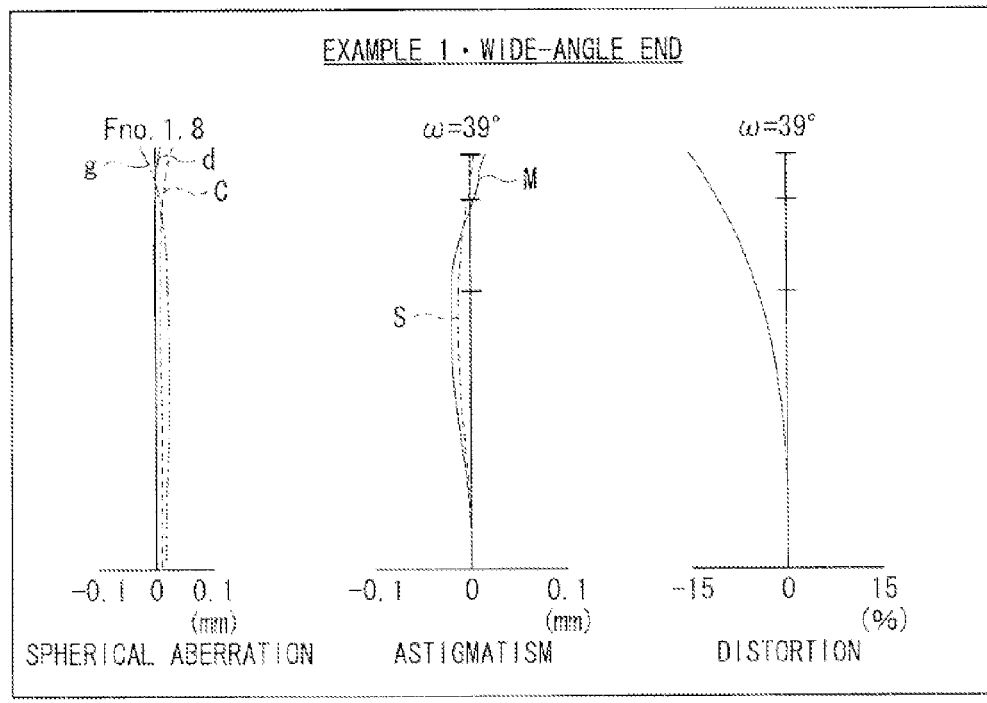
FIG. 2 is an aberration diagram illustrating spherical aberration, astigmatism, and distortion of a zoom lens corresponding to the numerical example 1 at a wide-angle end with an object at infinite distance.
Figure 3:
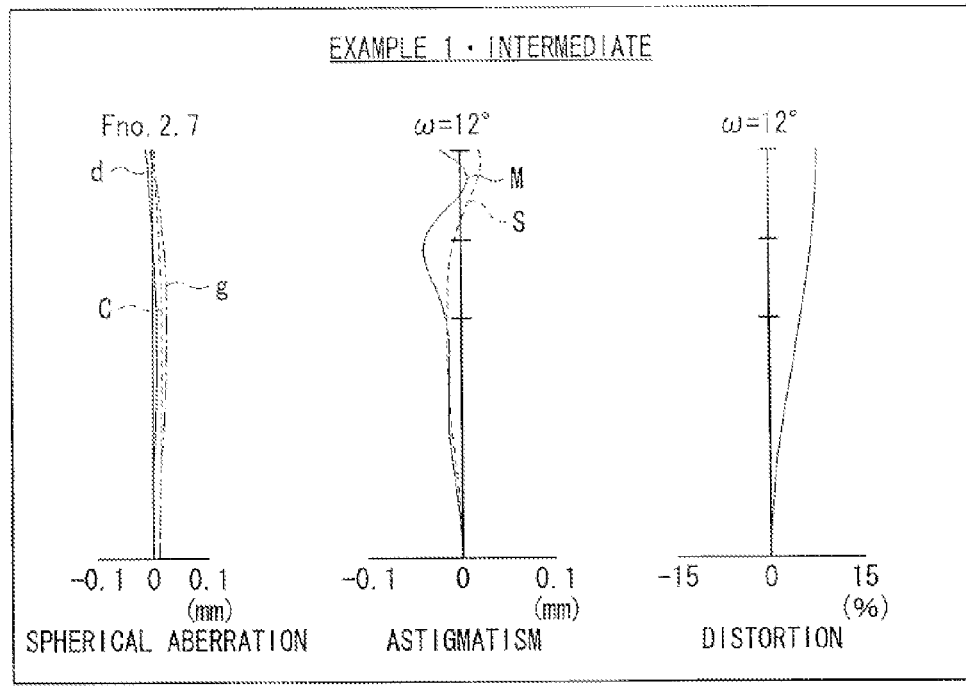
FIG. 3 is an aberration diagram illustrating spherical aberration, astigmatism, and distortion of the zoom lens corresponding to the numerical example 1 at an intermediate focal distance with an object at infinite distance.
Figure 4:
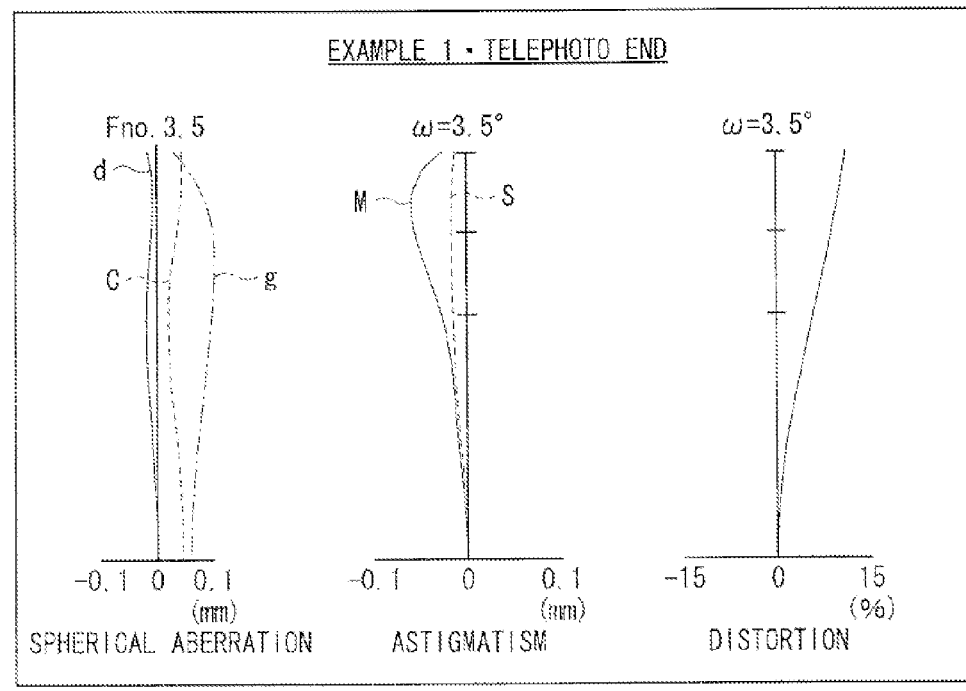
FIG. 4 is an aberration diagram illustrating spherical aberration, astigmatism, and distortion of the zoom lens corresponding to the numerical example 1 at a telephoto end with an object at infinite distance.
Figure 6:
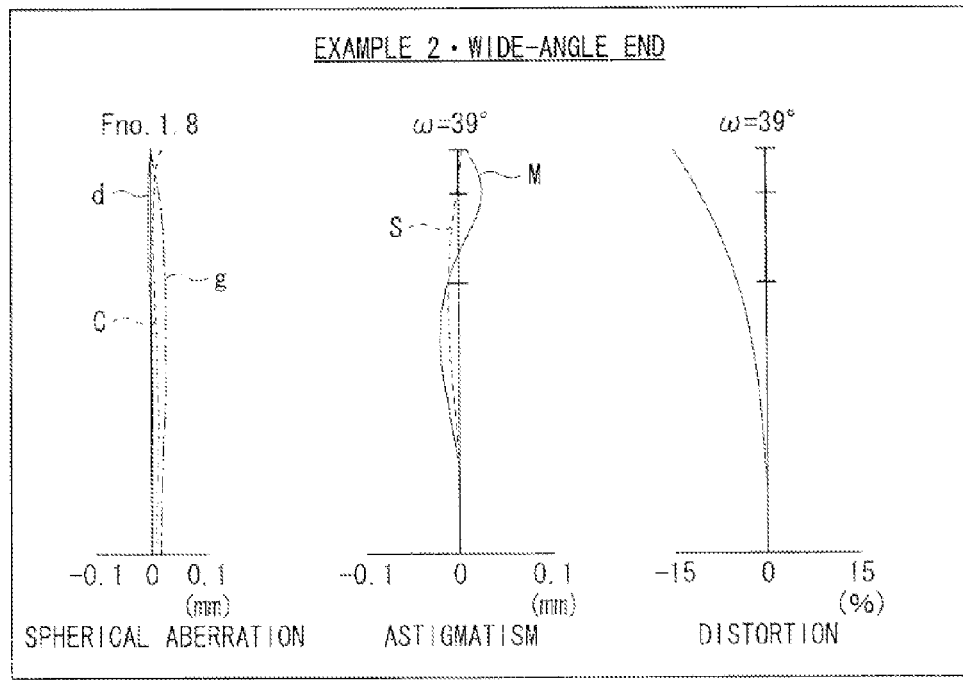
FIG. 6 is an aberration diagram illustrating spherical aberration, astigmatism, and distortion of a zoom lens corresponding to the numerical example 2 at a wide-angle end with an object at infinite distance.
Figure 7:
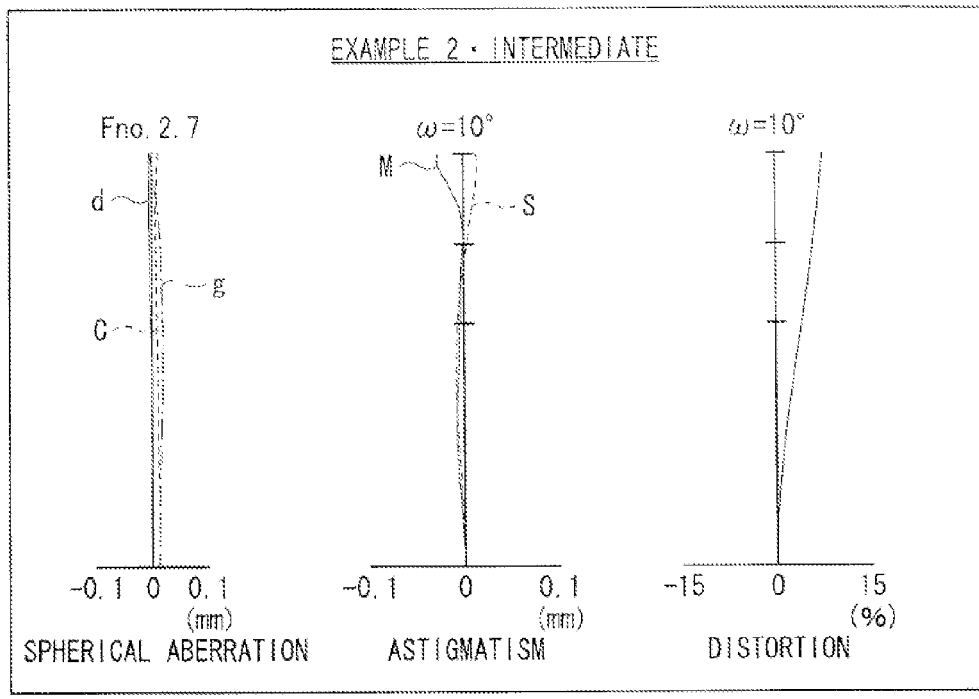
FIG. 7 is an aberration diagram illustrating spherical aberration, astigmatism, and distortion of the zoom lens corresponding to the numerical example 2 at an intermediate focal distance with an object at infinite distance.
Figure 8:
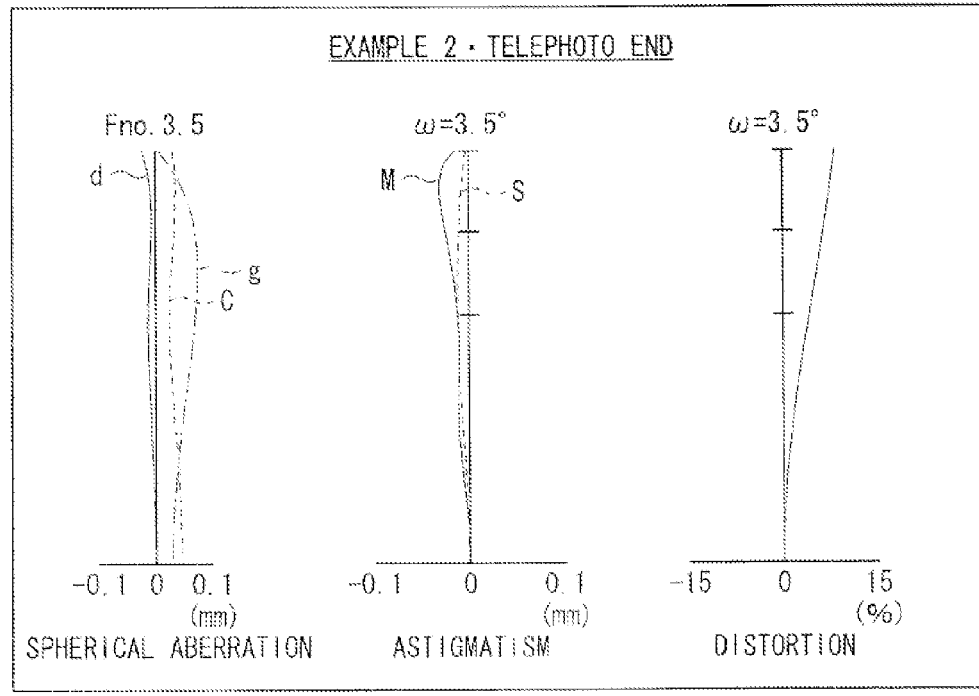
FIG. 8 is an aberration diagram illustrating spherical aberration, astigmatism, and distortion of the zoom lens corresponding to the numerical example 2 at a telephoto end with an object at infinite distance.

FIGS. 2 to 4 illustrate aberration performance of the zoom lens 1A according to the numerical example 1. FIGS. 6 to 8 illustrate aberration performance of the zoom lens 1B according to the numerical example 2. Each aberration is at infinite distance focusing. FIGS. 2 and 6 each illustrate aberrations at a wide-angle end. FIGS. 3 and 7 each illustrate aberrations at an intermediate focal distance. FIGS. 4 and 8 each illustrate aberrations at a telephoto end.

Each drawing is an aberration diagram illustrating spherical aberration, astigmatism, and distortion. Each aberration diagram illustrates aberrations with d-line (587.6 nm) as a reference wavelength. The spherical aberration diagram also illustrates aberrations with g-line (435.84 nm) and C-line (656.28 nm). In the astigmatism diagram, S (broken line) indicates aberration in a sagittal direction, and M (solid line) indicates aberration in a meridional direction.

As can be understood from the above-described aberration diagrams, a zoom lens having high focusing performance is achieved in each numerical example.

5. Other Embodiments

The technology according to the present disclosure is not limited to the above-described embodiments and Examples, and various modifications or alterations thereof may be made. For example, any of the shapes and the numerical values of the parts shown in the above-described numerical examples is merely a specific example for carrying out some example embodiments of the technology, and the technical scope of the technology should not be limitedly construed thereby.

For example, although the fifth lens group GR5 is configured of three sub lens groups, and one of the sub lens groups (the second sub lens group GR5-2) is shifted, as the second compensation lens group, in the direction substantially perpendicular to the light axis Z1 in the above-described embodiments and Examples, two or more sub lens groups may be shifted as the second compensation lens group.

Moreover, although the above-described embodiments and Examples have been described with the zoom lens having a configuration substantially including five lens groups, the zoom lens may have a configuration further including a lens having substantially no refracting power.

Furthermore, the technology encompasses any possible combination of some or all of the various embodiments described herein and incorporated herein.

It is possible to achieve at least the following configurations from the above-described example embodiments of the disclosure.

[1] A zoom lens, including:

a first lens group having a positive refracting power;

a second lens group having a negative refracting power;

a third lens group having a positive refracting power;

a fourth lens group having a positive refracting power; and a fifth lens group having a positive refracting power, and being configured of a plurality of sub lens groups, the first lens group, the second lens group, the third lens group, the fourth lens group, and the fifth lens group being arranged in recited order from an object plane, wherein the third lens group serves as a first compensation lens group, and one or more of the plurality of sub lens groups serves as a second compensation lens group, and each of the first compensation lens group and the second compensation lens group is configured to independently shift in a direction perpendicular to a light axis to allow an image formed on an image plane to be shifted in the direction perpendicular to the light axis.

[2] The zoom lens according to [1], wherein each of the first compensation lens group and the second compensation lens group is configured to independently shift in the direction perpendicular to the light axis at a wide-angle end to allow the following conditional expression (1) to be satisfied:

$$0 < \{(1-\beta 3w)\beta 3wr \times D3w\}/\{(1-\beta 5w)\beta 5wr \times D5w\} < 1 \qquad (1),$$

where, at the wide-angle end, $\beta 3w$ is a lateral magnification of the first compensation lens group, $\beta 3wr$ is a lateral magnification, as a whole, of the lens groups located between the first compensation lens group and the image plane, $D3w$ is a shift distance of the first compensation lens group in the direction perpendicular to the light axis, $\beta 5w$ is a lateral magnification of the second compensation lens group, $\beta 5wr$ is a lateral magnification, as a whole, of one or more of the sub lens groups located between the second compensation lens group and the image plane, and $D5w$ is a shift distance of the second compensation lens group in the direction perpendicular to the light axis.

[3] The zoom lens according to [1] or [2], wherein each of the first compensation lens group and the second compensation lens group is configured to independently shift in the direction perpendicular to the light axis at a telephoto end to allow the following conditional expression (2) to be satisfied:

$$1 < \{(1-\beta 3t)\beta 3tr \times D3t\}/\{(1-\beta 5t)\beta 5tr \times D5t\} < 2 \qquad (2)$$

where, at the telephoto end, $\beta 3t$ is a lateral magnification of the first compensation lens group, $\beta 3tr$ is a lateral magnification, as a whole, of the lens groups located between the first compensation lens group and the image plane, $D3t$ is a shift distance of the first compensation lens group in the direction perpendicular to the light axis, $\beta 5t$ is a lateral magnification of the second compensation lens group, $\beta 5tr$ is a lateral magnification, as a whole, of one or more of the sub lens groups located between the second compensation lens group and the image plane, and $D5t$ is a shift distance of the second compensation lens group in the direction perpendicular to the light axis.

[4] The zoom lens according to any one of [1] to [3], wherein each of the first compensation lens group and the second compensation lens group has one or more aspheric surfaces.

[5] The zoom lens according to any one of [1] to [4], wherein the first lens group and the third lens group are fixed without traveling in a direction of the optical axis in an operation of varying power, the second lens group travels in the direction of the light axis in the operation of the varying power, and the fourth lens group travels in the direction of the light axis to perform compensation of a focal position shift associated with the operation of the varying power and to perform focusing.

[6] The zoom lens according to any one of [1] to [4], wherein each of the first lens group, the second lens group, and the third lens group travels in a direction of the light axis in an operation of varying power, and the fourth lens group travels in the direction of the light axis to perform compensation of a focal position shift associated with the operation of the varying power and to perform focusing.

[7] The zoom lens according to any one of [1] to [6], further including a lens having substantially no refracting power.

[8] An image pickup unit provided with a zoom lens and an image pickup unit that outputs an image pickup signal corresponding to an optical image formed by the zoom lens, the zoom lens including:

a first lens group having a positive refracting power;

a second lens group having a negative refracting power;

a third lens group having a positive refracting power;

a fourth lens group having a positive refracting power; and a fifth lens group having a positive refracting power, and being configured of a plurality of sub lens groups, the first lens group, the second lens group, the third lens group, the fourth lens group, and the fifth lens group being arranged in recited order from an object plane, wherein the third lens group serves as a first compensation lens group, and one or more of the plurality of sub lens groups serves as a second compensation lens group, and each of the first compensation lens group and the second compensation lens group is configured to independently shift in a direction perpendicular to a light axis to allow an image formed on an image plane to be shifted in the direction perpendicular to the light axis.

[9] The image pickup unit according to [8], further including a lens having substantially no refracting power.

It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens, comprising:
a first lens group having a positive refracting power;
a second lens group having a negative refracting power;
a third lens group having a positive refracting power;
a fourth lens group having a positive refracting power; and
a fifth lens group having a positive refracting power, and being a plurality of sub lens groups,
the first lens group, the second lens group, the third lens group, the fourth lens group, and the fifth lens group being arranged in recited order from an object plane, wherein
the third lens group serves as a first compensation lens group, and one or more of the plurality of sub lens groups serves as a second compensation lens group, and
each of the first compensation lens group and the second compensation lens group independently shifts in a direction perpendicular to a light axis to allow an image formed on an image plane to be shifted in the direction perpendicular to the light axis,
wherein each of the first compensation lens group and the second compensation lens group independently shifts in the direction perpendicular to the light axis at a wide-angle end to allow the following conditional expression (1) to be satisfied:

$$0 < \{(1-\beta 3w)\beta 3wr \times D3w\}/\{(1-\beta 5w)\beta 5wr \times D5w\} < 1 \qquad (1),$$

where, at the wide-angle end,
$\beta 3w$ is a lateral magnification of the first compensation lens group,
$\beta 3wr$ is a lateral magnification, as a whole, of a lens groups located between the first compensation lens group and the image plane,
$D3w$ is a shift distance of the first compensation lens group in the direction perpendicular to the light axis,
$\beta 5w$ is a lateral magnification of the second compensation lens group,
$\beta 5wr$ is a lateral magnification, as a whole, of one or more of sub lens groups located between the second compensation lens group and the image plane, and
$D5w$ is a shift distance of the second compensation lens group in the direction perpendicular to the light axis.

2. A zoom lens, comprising:
a first lens group having a positive refracting power;
a second lens group having a negative refracting power;
a third lens group having a positive refracting power;
a fourth lens group having a positive refracting power; and
a fifth lens group having a positive refracting power, and being a plurality of sub lens groups,
the first lens group, the second lens group, the third lens group, the fourth lens group, and the fifth lens group being arranged in recited order from an object plane, wherein
the third lens group serves as a first compensation lens group, and one or more of the plurality of sub lens groups serves as a second compensation lens group, and
each of the first compensation lens group and the second compensation lens group independently shifts in a direction perpendicular to a light axis to allow an image formed on an image plane to be shifted in the direction perpendicular to the light axis,
wherein each of the first compensation lens group and the second compensation lens group independently shifts in the direction perpendicular to the light axis at a telephoto end to allow the following conditional expression (2) to be satisfied:

$$1 < \{(1-\beta 3t)\beta 3tr \times D3t\}/\{(1-\beta 5t)\beta 5tr \times D5t\} < 2 \qquad (2)$$

where, at the telephoto end,
$\beta 3t$ is a lateral magnification of the first compensation lens group,
$\beta 3tr$ is a lateral magnification, as a whole, of a lens groups located between the first compensation lens group and the image plane,
$D3t$ is a shift distance of the first compensation lens group in the direction perpendicular to the light axis,
$\beta 5t$ is a lateral magnification of the second compensation lens group,
$\beta 5tr$ is a lateral magnification, as a whole, of one or more of sub lens groups located between the second compensation lens group and the image plane, and
$D5t$ is a shift distance of the second compensation lens group in the direction perpendicular to the light axis.

3. The zoom lens according to claim 1, wherein each of the first compensation lens group and the second compensation lens group has one or more aspheric surfaces.

4. The zoom lens according to claim 1, wherein
the first lens group and the third lens group are fixed without traveling in a direction of the light axis in an operation of varying power,
the second lens group travels in the direction of the light axis in the operation of the varying power, and
the fourth lens group travels in the direction of the light axis to perform compensation of a focal position shift associated with the operation of the varying power and to perform focusing.

5. The zoom lens according to claim 1, wherein
each of the first lens group, the second lens group, and the third lens group travels in a direction of the light axis in an operation of varying power, and
the fourth lens group travels in the direction of the light axis to perform compensation of a focal position shift associated with the operation of the varying power and to perform focusing.

6. An image pickup unit provided with a zoom lens that outputs an image pickup signal corresponding to an optical image formed by the zoom lens, the zoom lens comprising:
a first lens group having a positive refracting power;
a second lens group having a negative refracting power;
a third lens group having a positive refracting power;
a fourth lens group having a positive refracting power; and
a fifth lens group having a positive refracting power, and being a plurality of sub lens groups,
the first lens group, the second lens group, the third lens group, the fourth lens group, and the fifth lens group being arranged in recited order from an object plane, wherein
the third lens group serves as a first compensation lens group, and one or more of the plurality of sub lens groups serves as a second compensation lens group, and
each of the first compensation lens group and the second compensation lens group independently shifts in a direction perpendicular to a light axis to allow an image formed on an image plane to be shifted in the direction perpendicular to the light axis, wherein each of the first compensation lens group and the second compensation lens group independently shifts in the direction perpendicular to the light axis at a wide-angle end to allow the following conditional expression (1) to be satisfied:

$$0 < \{(1-\beta 3w)\beta 3wr \times D3w\} / \{(1-\beta 5w)\beta 5wr \times D5w\} < 1 \quad (1),$$

where, at the wide-angle end, $\beta 3w$ is a lateral magnification of the first compensation lens group, $\beta 3wr$ is a lateral magnification, as a whole, of a lens groups located between the first compensation lens group and the image plane, $D3w$ is a shift distance of the first compensation lens group in the direction perpendicular to the light axis, $\beta 5w$ is a lateral magnification of the second compensation lens group, $\beta 5wr$ is a lateral magnification, as a whole, of one or more of sub lens groups located between the second compensation lens group and the image plane, and $D5w$ is a shift distance of the second compensation lens group in the direction perpendicular to the light axis.

* * * * *